Feb. 5, 1963 J. MOZIEK ETAL 3,076,637
CONTINUOUS BLENDER FOR THERMOPLASTIC MATERIALS
Filed Jan. 30, 1959 2 Sheets-Sheet 1

JOHN MOZIEK  INVENTORS
L. B. BULLOCK

BY *Cornelius H. Cleary*
ATTORNEY

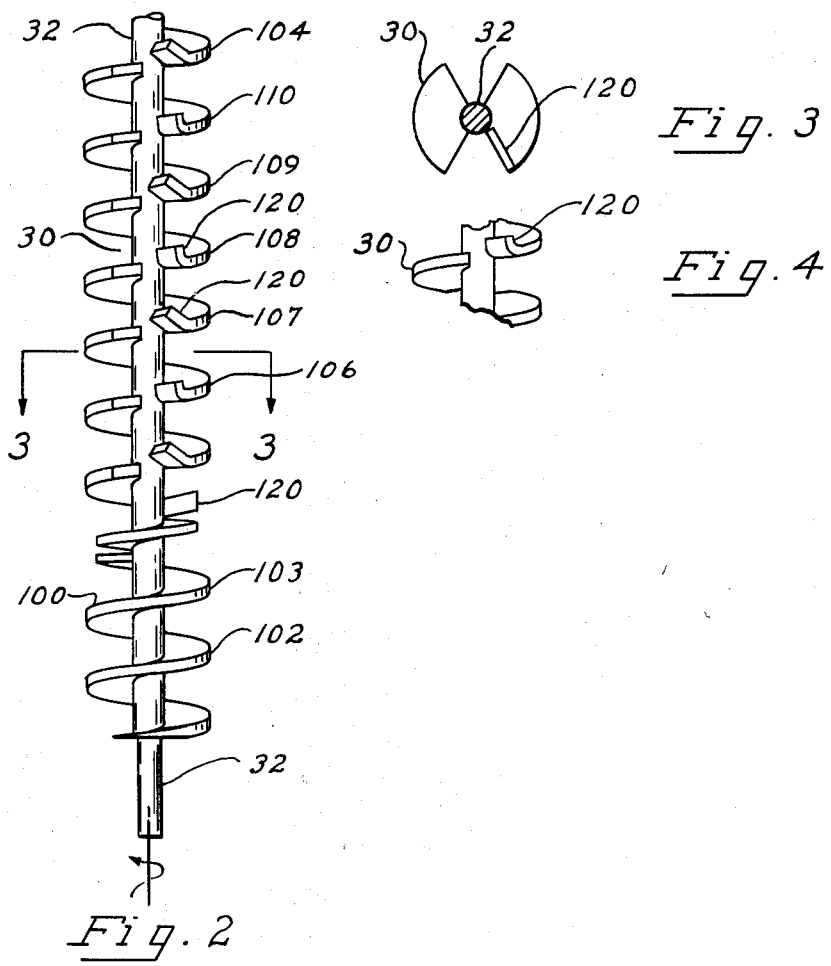

United States Patent Office 3,076,637
Patented Feb. 5, 1963

3,076,637
CONTINUOUS BLENDER FOR THERMO-
PLASTIC MATERIALS
John Moziek, South Hadley Falls, Mass., and Luther
Burnham Bullock, Texas City, Tex., assignors to Monsanto Chemical Company, St. Louis, Mo., a corporation of Delaware
Filed Jan. 30, 1959, Ser. No. 790,172
7 Claims. (Cl. 259—8)

The present invention relates to admixing additives with thermoplastic materials, and more particularly to apparatus designed to achieve this in a continuous manner.

Because of the number of variables involved, admixing additives, such as colorants, and dispersing and molding aids such as lubricants and the like, into thermoplastic materials such as polystyrene, polyethylene, polyvinyl chloride and others has been achieved using batch type mixers. This has been particularly true for blending colorants into thermoplastic materials where uniform distribution and dispersion of the colorants throughout the thermoplastic material is necessary.

In providing large quantities of colored thermoplastic materials exhibiting uniformity of coloration, by blending technique, it has been necessary to do so either by blending a comparatively large number of smaller batches or by blending fewer large batches, the latter requiring vastly longer blending times per batch. In either case, the time in toto consumed in blending large quantities of thermoplastic material exhibiting uniform coloration, has been considerable.

Accordingly, it is a principal object of the present invention to provide apparatus by which additives can be continuously and uniformly admixed with thermoplastic materials.

Other objects of the invention will in part be obvious and will in part appear hereinafter.

These and other objects of the invention can be attained in an apparatus comprising in combination a vertically aligned cylindrical chamber, an input duct downwardly communicating to the lower portion of said chamber, said input duct being provided with metering means to quantitatively regulate feeding of additives and thermoplastic material into said chamber, an output duct downwardly communicating from the upper portion of said chamber, a rotatable screw located to the interior of said chamber the helical rib of said screw at least in part being interrupted to form a series of spaced partial flights, each of said partial flights having a sectorial configuration with relation to said axis, and a plurality of said partial flights being provided with upwardly projecting leading edges and means for rotating said screw.

A more complete understanding of the invention can be had from the following detailed description when considered in conjunction with the accompanying drawing in which:

FIG. 2 is an enlarged perspective front elevation with parts broken illustrating a helical screw which can be used in the present invention.

FIG. 3 is a top elevation with parts broken taken along the line 3—3 of FIG. 2.

FIG. 4 is a partial front elevation with parts broken corresponding to FIG. 3.

Figure 1:
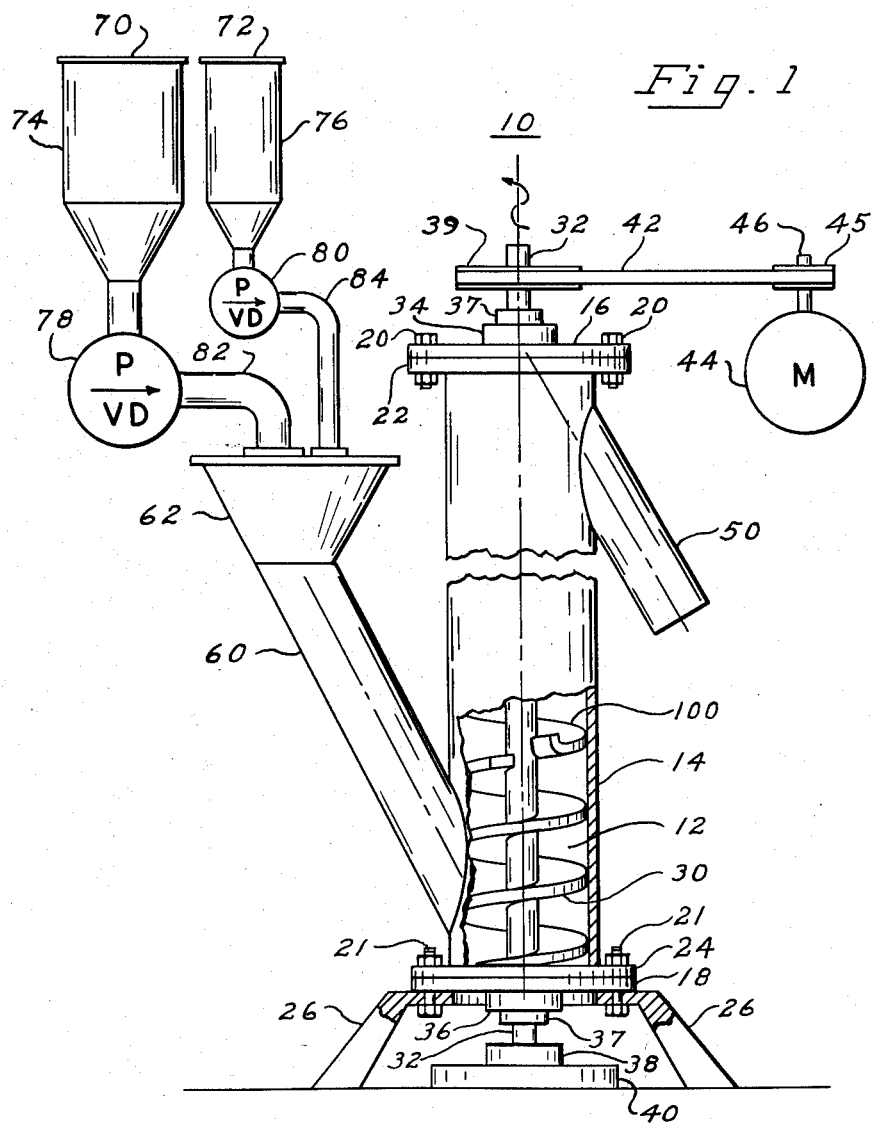
FIG. 1 is a schematic front elevation with parts broken illustrating a blending apparatus which is an embodiment of the present invention.

Referring to the figures and initially to FIGURE 1 illustrative blending apparatus 10 includes a vertically aligned cylindrical chamber 12 circumscribed by a cylindrical barrel 14 and terminated by end plates 16 and 18. End plates 16 and 18 are secured to barrel 14 by means of nutted-bolts 20—20 and 21—21 projecting through flanges 22 and 24, the latter two radially extending from barrel 14. Bolts 21—21 incidentally incorporate base members 26—26 as to position chamber 12 in the described vertical alignment.

A rotatable screw 30 is positioned within chamber 12. Screw 30 is in close peripheral tolerance with the inner surface of barrel 14. The central position, or shaft 32 of screw 30 projects upwardly through bearing 34 and downwardly through bearing 36, bearings 34 and 36 being set in plates 16 and 18 respectively. O-ring-type seals 37—37 serve to prevent leakage arountd shaft 32. At its extreme lower end, shaft 32 is seated in bearing 38 which is in turn integral of base-plate 40. To provide rotation to screw 30, a pulley 39 is located at the upper end of shaft 32 which is fitted with belt 42, the latter serving to transmit drive from motor 44 through pulley 45 also fitted with belt 42 and located on drive shaft 46 of motor 44.

An output duct, preferably having an annular configuration, formed by pipe 50 and located to the upper portion of barrel 14, communicates downwardly from cylindrical chamber 12. An interior angle ranging 5° to about 50° is formed between the longitudinal axis of cylindrical chamber 12 and a like longitudinal axis of pipe 50. (Longitudinal axes are shown as dotted lines.) An input duct formed by pipe 60 downwardly communicates to the lower portion of chamber 12. An interior angle ranging 5° to about 50° is described between the longitudinal axis of chamber 12 and the longitudinal axis of input duct 60. Both the output duct 50 and the input duct 60, as shown, form internal angles of about 45° with the longitudinal axis of chamber 12.

In the embodiment presently under consideration, a main hopper 62 is positioned on input duct 60. A pair of metering devices 70 and 72 are provided to quantitatively regulate the amounts of thermoplastic material and additive being delivered by the input duct to chamber 12. The metering devices 70 and 72 are shown taking the particular form of hoppers 74 and 76 provided with variable delivery pumps 78 and 80 which connect through pipes 82 and 84 into main hopper 62. Thermoplastic material metering means 70 is shown having proportions larger than the proportions of additive metering means 72 for the reason that larger quantities of thermoplastic materials than additives will generally be used in the blending process.

Referring now to FIGS. 2–4, screw 30 is provided with a peculiar design which serves to advance the materials being blended upwardly through cylindrical chamber 12 while simultaneously providing mixing action to these materials. The helical rib, generally shown at 100, of screw 30, while being incomplete, is provided with a pitch of .15 x D to .70 x D, where D represents the over-all diameter of the screw. In the present embodiment the two bottommost flights 102 and 103, of screw 30, are shown to be complete flights. In addition, identical flights 102 and 103 are positioned within chamber 12 approximately in vertical relationship to where input duct 60 communicates with chamber 12. The remaining flights up to and including top flight 104 of the helical rib 100 are formed from partial flights as indicated at 106, 107, 108, 109 and 110, each of which forms a sectorial configuration when considered in cross-sectional relationship to the imaginary longitudinal axis of chamber 12. The sectors can form angles of between 90° to 180°, again when considered in cross-sectional relation to the longitudinal axis of chamber 12. A plurality of the partial flights, 106, 107, 108, 109, 110 etc. are provided with upwardly projecting leading edges 120. This expedient is shown with particularity in FIG. 4. Leading edges 120 can be formed by the forepart of the flights being angled upward 15° to 90° from the normal helix angle. In the preferred embodiment shown in FIG. 2 leading edges 120—120 are shown alternating 45° and 90° from the normal helix angle. The length of screw 30 can be varied in accordance with the rotational speed of screw 30, provided by a given drive mechanism or motor 44. With higher rotational speeds provided to screw 30, shorter screw lengths can be used to attain the desired admixture. The depth of the helical rib 100, which can otherwise be described as flight depth, can be varied considerably. In doing so the minimum strength requirements of rib 100 and screw shaft 32 must be maintained.

In the embodiment shown in FIG. 2, screw 30 has a pitch of .33 x D. The two flights at the bottom, i.e., 102 and 103 are complete. The remainder of helical rib 100 constitutes partial flights having an alternating sectorial angle of 170° and 180° with the leading edges of the flights projected upwardly at alternately 45° and 90° from the normal helix angle. In this embodiment, screw 30, when extended to include eighteen flights and the added flights being of the incomplete type, has about 1.0% conveying capacity as compared to a helix screw having a complete helical rib and otherwise corresponding to screw 30. Apart from the two bottom flights 102 and 103, the remainder of helical rib 100 is shown made up of partial flights, and while such an embodiment is preferred, it is possible to have some of the partial flights substituted for by complete flights. Additionally, while all of the partial flights are shown having alternating sectorial angles other variations as to angle sizes as well as uniform angle sizes can be had in a single embodiment.

Other variations can be carried out with respect to the apparatus of the present invention. For instance, the metering devices shown in FIG. 1 can be any volumetric type, gravimetric-type and other type metering devices, including vibratory and disk type feeders capable of metering thermoplastic and additive materials designed for blending.

In operation, thermoplastic material is metered through thermoplastic material metering means 70, while the additives are metered through metering means 72. After collection in main hopper 62, these materials are caused to pass down through input duct 60 and into cylindrical chamber 12. Rotatable screw 30, which is being rotated continuously, engages the materials on their introduction into chamber 12 causing them then to be advanced upwardly, in an over-all manner, through chamber 12. The materials exit from chamber 12 through output duct 50 as a uniformly and intimately blended admixture of thermoplastic and additives.

The materials, both thermoplastic and additives, which can be best processed through the apparatus of the present invention are those which are solid, more particularly granular or pellet in form. Waxy and liquid additive materials can also be accommodated with the solid thermoplastic occasioning little, if any, adjustment of the apparatus. It is also possible to process materials which have been partially blended or pre-blended prior to their introduction into the sponsored apparatus.

*Example I*

A. A blender is provided having the following design.
Screw:
    Shaft—Steel rod 2-inches in diameter by 60 inches long; install level on vertical alignment.
    Flights—Type—Right-handed helix, slotted and baffled as described below:
        Thickness, gage _____ 10
        Pitch, inch _____ 2
        Depth, inch _____ 2
        Number flights _____ 18
        Flight sections _____ 4
          (1) Bottom—2 flights, 100% conveying area.
          (2) Bottom-Middle—next 2 flights, 51% conveying area; 2 slots 1-inch at shaft by 2-inches at peripheral for each flight.
          (3) Middle—11 flights, 39% conveying area; each flight slotted as above, then baffle each leading edge of part flights ¾-inch up at alternate 90° and 45° angles to normal.
          (4) Top—3 flights, slot same as for bottom-middle section.
        NOTE.—Slotting of helix is alternately 180° and 170°.
Barrel:
    Material—Seamless steel pipe 6-inch diameter by 44 inches long.
    Ducts—Two 3-inch; one 8-inch to center from top, angling 45° down; another 4¼ inch to center from bottom, angling 45° up.
Drive Mechanism: Motor—Electric, 3-H.P., 550-v., 3-phase, 60 cycle, 1170 r.p.m.
Metering Devices:
    (1) Additive-metered, adjustable-speed rotating disc-brush type. (Omega, Model F-51; B.I.F. Industries.)
    (2) Thermoplastic—same as 1 adjusted to operate at conveying capacity of the screw.

B. A dry mix having the following proportions is continuously charged into the above identified blender:

Polystyrene—(30 mesh crystal) _____ 99.6
Additives (pre-blended—less than 100 micron particle size) _____ 0.4
    Cadmium selenide red anthraquinone
    red zinc stearate
                            100.0

When operated with the screw rotated at 870 r.p.m., 20,000 pounds of blended product is obtained during a 29 hour run. The thermoplastic material exhibits uniform coloration throughout with no further intermixing or blending of the material being necessary.

It will thus be seen that the objects set forth above among those made apparent from the preceding description are efficiently attained, and, since certain changes may be made in the apparatus or in carrying out operation of the same, without departing from the scope of the invention, it is intended that all matter contained in the above description shall be interpreted as illustrative and not in a limiting sense.

What is claimed is:
1. Apparatus for continuously blending additives with thermoplastic materials comprising in combination a substantially vertical cylindrical chamber, an input duct downwardly communicating to the lower portion of said chamber as to form an interior angle with the longitudinal axis of said chamber of about 5°–50°, said input duct being provided with metering means to quantitatively regulate feeding of additives and thermoplastic material into said chamber, an output duct downwardly communicating from the upper portion of said chamber as to form an interior angle with the longitudinal axis of said chamber of about 5°–50°, a rotatable screw located to the interior of said chamber, the helical rib of said screw being at least in part interrupted to form a series of spaced partial flights, each of said partial flights having a sectorial configuration with relation to said axis and a plurality of said flights being provided with upwardly projecting leading edges and means for rotating said screw.

2. The apparatus according to claim 1 wherein each of the partial flights forms a sector in cross-sectional relationship to said axis having an angle of 90 to 180°.

3. The apparatus according to claim 1 wherein the input duct and output duct form an interior angle with the longitudinal axis of said chamber of about 45°.

4. The apparatus according to claim 1 wherein said screw has a pitch of about .15 to .70 times the overall diameter of said screw.

5. Apparatus for continuously blending additives with thermoplastic materials comprising in combination a substantially vertical cylindrical chamber, an input duct communicating to the lower portion of said chamber, said input duct being provided with metering means to quantitatively regulate feeding of additives and thermoplastic material into the lower portion of said chamber, an output duct communicating from the upper portion of said chamber, a rotatable screw located to the interior of said chamber, the helical rib of said screw being continuous through the lower portion of the chamber defined by the entrance of said input duct and being interrupted at least in part thereabove to form a series of spaced partial flights, each of said partial flights having a sectorial configuration with relation to said axis and a plurality of said flights being provided with upwardly projecting leading edges and means for rotating said screw.

6. The apparatus according to claim 5 wherein each of the partial flights forms a sector in cross-sectional relationship to said axis having an angle of 90 to 180°.

7. The apparatus according to claim 5 wherein said screw has a pitch of about .15 to .70 times the overall diameter of said screw.

References Cited in the file of this patent

UNITED STATES PATENTS

| | | |
|---|---|---|
| 692,011 | Hansen | Jan. 28, 1902 |
| 1,558,580 | Bishop | Oct. 27, 1925 |
| 1,623,001 | Gollbach | Mar. 29, 1927 |
| 2,488,129 | La Lande | Nov. 15, 1949 |
| 2,626,132 | Reed | Jan. 20, 1953 |
| 2,731,247 | Hudry | Jan. 17, 1956 |